Figure 1:
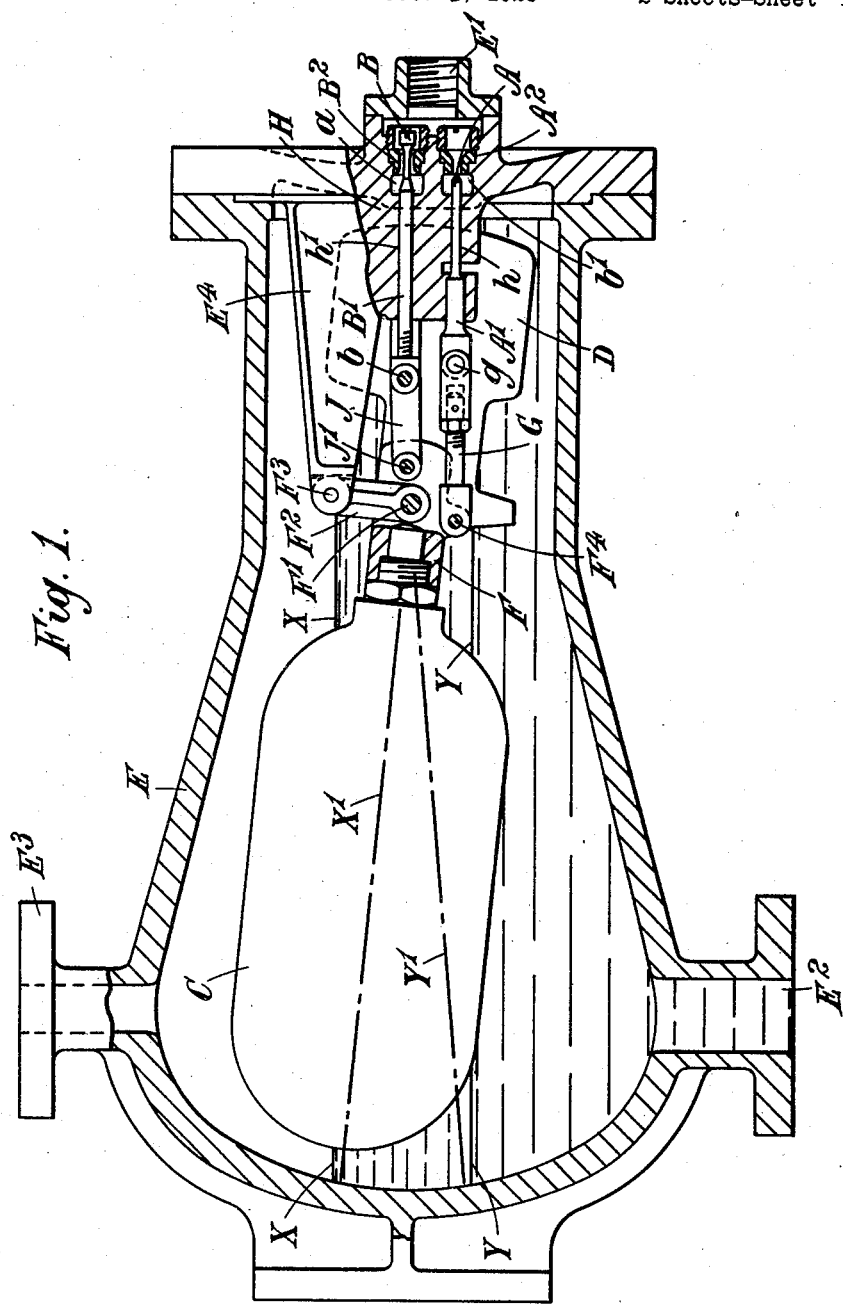

Dec. 16, 1930. W. SMITH 1,785,149
FEED WATER REGULATOR
Filed Oct. 1, 1928 2 Sheets-Sheet 1

Inventor:
Walter Smith
By
Attorney.

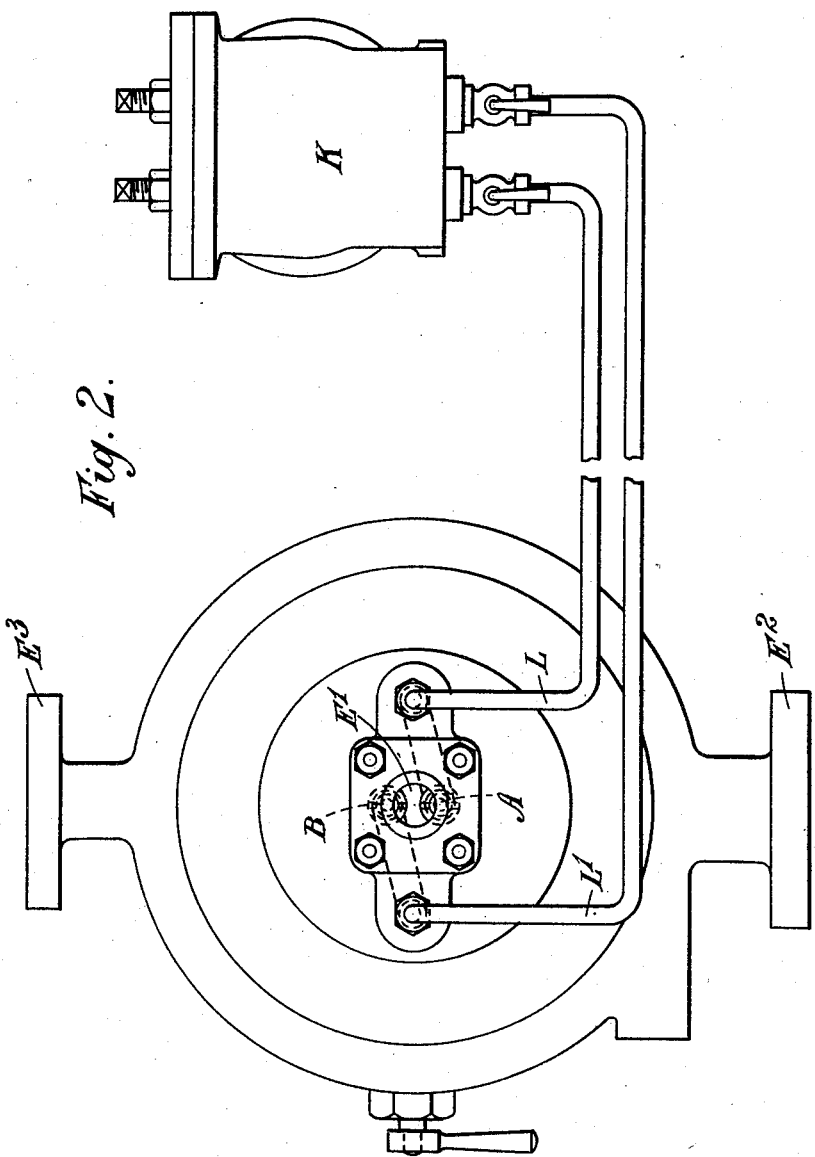

Patented Dec. 16, 1930

1,785,149

UNITED STATES PATENT OFFICE

WALTER SMITH, OF HARROW-ON-THE-HILL, ENGLAND

FEED-WATER REGULATOR

Application filed October 1, 1928, Serial No. 309,567, and in Great Britain October 15, 1927.

This invention relates to improvements in apparatus for controlling the flow of a liquid to or from a vessel such as a boiler, tank, or like receptacle, and is of the kind which is operated hydraulically by a float-controlled relay consisting of a pair of control valves to maintain a constant feed or a desired level.

According to the invention the relay is arranged so that the control valves must close in cascade and at different liquid levels.

Referring to the accompanying drawings:—

Fig. 1 is a vertical longitudinal section of an apparatus constructed in accordance with or embodying the present invention, and Fig. 2 is a view of the same apparatus.

A and B are the two control valves, C is the float and D is the counter-balance weight. The apparatus is mounted within a feed-water control box E which may be arranged in any convenient position relatively to the boiler and is furnished with a water outlet $E^1$ leading to a feed tank or to waste, a feed-water inlet $E^2$ leading to the boiler and a steam inlet $E^3$ which is also connected to the boiler.

In the present embodiment of the invention the float C and the balance weight D are mounted at the opposite ends of a lever F, the pivot pin or fulcrum $F^1$ of which is carried in the lower end of a link $F^2$, the other end of which is freely suspended on a pivot $F^3$ carried by a stationary bracket or support $E^4$ mounted on an end plate or cover of the box E.

On the lever F, and below the pivot or fulcrum $F^1$, is a pivot pin $F^4$ to which is connected one end of an extensible or adjustable link G, the other end of which is pivotally connected at $g$ to the outer end of the stem $A^1$ of the valve A. The stem $A^1$ of the valve A is mounted to slide in a guide of bearing $h$ in a valve box or casing H to which is coupled the water outlet $E^1$. The stem $A^1$ has a pointed or tapered end which forms the valve A and is adapted to engage a seat $A^2$ fitted within the box H.

The valve B is provided with a seat $B^2$ mounted in the valve box H, and the stem $B^1$ of this valve is mounted to slide in a bearing or guide $h^1$ in the box H.

The outer end of the stem $B^1$ is pivoted at $b$ to one end of a link J, the other end of which is pivotally connected to the lever F at $J^1$ somewhat above the fulcrum $F^1$.

On the drawing the line X indicates, say, the "cruising" water-level, and the line $X^1$ the centre line of the float C with the water at this level. Similarly the line Y indicates the "full-power" water-level, and the line $Y^1$ the centre line of the float with the water at this level.

Assuming the float to be in the position shown, a lowering of the water-level from the level X will cause the float to turn on the pivot $F^1$ and close the valve A; and when, due to a sufficient fall in the water-level, the valve A is fully closed, then the float C will turn on the pivot $F^4$, which now becomes the fulcrum, and close the valve B. The valve B will be fully closed when the level of the water is as indicated by the line Y.

The chambers $b^1$ and $a$ of the control valves A and B respectively are connected by separate pipes L $L^1$ with two check valves (not shown) which are mounted in a common valve box K. Each check valve in the box K is capable of dealing with half the total feed, but the proportions can be varied by regulating the lift of one or the other of these check valves. By means of this arrangement continuous feed can be maintained.

When the valves A or B are open, the water passes to waste or to the feed tank. When one or both valves is or are closed, the flow of water through it or them is varied or reduced, and this checking of the flow causes the water to react upon and operate the check valves accordingly, to vary the flow through the box K.

In place of the freedom of movement of the float or its lever being provided by the hinged or pivoted link above referred to, this freedom may be provided by making the fulcrum of the lever F an easy or loose fit in its housing.

The valves A and B may be of any other appropriate construction than that shown.

What I claim is:—

1. In a feed-water control, the combination of a water chamber having an outlet for the feed-water; a pair of valves in said chamber to control the outlet; a float in the chamber; a lever pivoted in said chamber and carrying the float; and pivotal connections between the valves and the lever at opposite sides of the lever pivot for operating said valves in succession consequent upon the movement of the float in a single direction.

2. A feed-water control according to claim 1, in which the connections between the float lever and the two control valves cause the lever to close first one valve and then the other during the continued downward movement of the float.

3. A feed-water control according to claim 1, in which the float lever is mounted in the water chamber to rock about two separate fulcra, one above the other, during the continued downward movement of the float; and in which the connections between said lever and the two control valves close first one valve and then the other during such downward movement of the float.

4. In a feed-water control, the combination of a water chamber having an inlet and an outlet for the feed-water; a pair of valves in said chamber to control the outlet; a float in the chamber; a lever connected to the float; a stationary support; a suspension link pivoted at one end to said support and at the other end to said lever; a link coupling one valve to the lever at one side of its pivot; and a second link coupling the other valve to the lever at the opposite side of the pivot thereof.

5. A feed-water control mechanism for a steam boiler, comprising, in combination, a float chamber having communication with the water and steam spaces of the boiler and provided with an outlet for the feed-water; two separately operable control valves associated with said outlet; a float in said chamber; a lever connected with the float to be operated thereby; a link pivoted to the float lever; a stationary pivot for said link; a link coupled to one control valve at one side of the normal fulcrum thereof; and a link connected to the other control valve and pivoted to the float lever at the other side of the fulcrum thereof and adapted to form a second fulcrum for the lever, whereby said lever is caused to rock first about its normal fulcrum to operate one control valve, and then about its second fulcrum to operate the other control valve, during the downward movement of the float.

6. In a feed-water control, in combination, a water chamber having an outlet; a pair of valves to control the outlet; a float lever in said chamber having two separate fulcra; and connections between the float lever for rocking the latter first about one and then about the other fulcrum during the continued downward movement of the float, thereby to operate said valves one after the other during said movement.

In testimony whereof I affix my signature.
WALTER SMITH.